(12) United States Patent
Stevens et al.

(10) Patent No.: US 6,234,017 B1
(45) Date of Patent: May 22, 2001

(54) TRANSDUCER ASSEMBLY

(75) Inventors: Kevin Stevens, Saffron Walden; Colin Smith, Nuneaton, both of (GB)

(73) Assignee: Pulsar Process Measurement Limited, Derbyshire (GB)

( * ) Notice: Subject to any disclaimer, the term of this patent is extended or adjusted under 35 U.S.C. 154(b) by 0 days.

(21) Appl. No.: 09/182,374

(22) Filed: Oct. 29, 1998

(30) Foreign Application Priority Data

Nov. 1, 1997 (GB) .................................................. 9722987

(51) Int. Cl.[7] .................................................. G01F 23/00
(52) U.S. Cl. .................... 73/270 V; 310/316; 310/317
(58) Field of Search ................. 73/290 V, 642, 73/629, 597; 310/316, 317, 319, 314

(56) References Cited

U.S. PATENT DOCUMENTS

| | | | |
|---|---|---|---|
| 2,990,543 | * 6/1961 | Rod | 73/290 V |
| 3,916,373 | 10/1975 | Schroder | 367/137 |
| 4,004,165 | * 1/1977 | Bredael et al. | 310/8.1 |
| 4,144,517 | * 3/1979 | Baumoel | 73/290 V |
| 4,404,502 | 9/1983 | Magori et al. | 310/328 |
| 4,523,472 | * 6/1985 | Blades | 73/632 |
| 4,736,192 | 4/1988 | Angerer | 340/384.6 |
| 5,087,850 | * 2/1992 | Suzuta | 310/316 |
| 5,095,747 | * 3/1992 | Smith | 73/290 V |
| 5,361,013 | * 11/1994 | Wiget | 310/316 |
| 5,456,114 | * 10/1995 | Liu et al. | 73/597 |
| 5,594,352 | * 1/1997 | Johnson | 324/664 |
| 5,979,233 | * 11/1999 | Johnson | 73/149 |

FOREIGN PATENT DOCUMENTS

| | | |
|---|---|---|
| 0 054 703 | 6/1982 | (EP) . |
| 0 133 570 | 2/1985 | (EP) . |

* cited by examiner

Primary Examiner—Hezron Williams
Assistant Examiner—Rose M. Miller
(74) Attorney, Agent, or Firm—Frishauf, Holtz, Goodman, Langer & Chick, P.C.

(57) ABSTRACT

A transducer assembly adapted for the pulse-emission of a signal includes a transducer (10) with a drive-circuit (20) therefor. The drive circuit (20) includes a charge-storage device (21), a wound-coil device (23) and one or more switching-elements (24, 25). The assembly can be used to determine the level of a fluid in an enclosed vessel.

13 Claims, 2 Drawing Sheets

TRANSDUCER ASSEMBLY

BACKGROUND OF THE INVENTION

This invention relates to a transducer assembly and in particular to a transducer assembly adapted for the pulse-emission of a signal.

This invention also relates to a method of comparing a first condition within a container and a second condition within said container by means of such a transducer system.

Transducer assemblies are known in which a signal is generated by way of a cable and a step-up transformer. The need to provide a high peak power in such an assembly restricts the choice of wire used for the cable.

The applicants have now devised a transducer assembly in which only the average power need be delivered along the cable, which can operate at a low voltage and low current, which is capable of considerably enhanced resolution and which can be used in hazardous areas (for example to determine the level of a flammable substance in an enclosed vessel).

SUMMARY OF THE INVENTION

In a first aspect, the present invention provides a transducer assembly adapted for the pulse-emission of a signal, the assembly comprising:

(a) a transducer;

(b) a drive-circuit for the transducer (a), in which the drive-circuit includes a charge storage device, a wound coil assembly and at least one switching element, all components of the drive-circuit (b) being operatively associated with one another and with the transducer (a).

Suitably, the transducer (a) comprises one or more surfaces (e.g. of a ceramic material) which are capable of exhibiting a piezo-electric effect.

Preferably, the transducer (a) is an air-transducer.

Preferably, the charge storage device comprises a capacitor, for example a capacitor having a capacitance in the order of 1000 $\mu$F. The capacitor may be operatively associated with one or more batteries.

Alternatively, the charge storage device may comprises one or more batteries, with the capacitor being omitted.

The wound coil device may comprise one or more windings wound on a magnetic core, in the manner of a transformer, and conventionally termed an inductor due to the presence of a gap in the magnetic core and therefore deliberate energy storage within the device. Preferably the inductor has an inductance in the order of 1 mH. Suitably, the inductor may be adapted to resonate with the transducer (a) at a selected frequency or over a selected frequency-range.

The inductor may be provided with any number of tap points (including none), the principle purpose of which are to control the proportion of the transducer peak voltage that is presented across the switching elements.

The switching elements will preferably comprise semi-conductor devices. At least one switching element is required, and in this simplest configuration the switching element is closed in order to build up a current in the inductor, and opened in order to redirect this current onto the transducer.

A further switching element can be added, in conjunction with a dissipative element, or resistance, in order to dissipate the pulse energy after a defined time, this has the effect of curtailing the duration of the sound pulse.

Further switches can be incorporated in order to recycle some of this energy.

In a second aspect, the present invention provides a method of comparing a first condition and a second condition of a container, in which one or more parameters of each said condition is measured by means including at least one transducer assembly according to the first aspect of the present invention, hereinabove described, and the results of each said measurement are compared by means of a comparison system operatively associated with said transducer assembly.

For example, the first condition of the container may correspond to the situation wherein the container is empty and the second condition may be may correspond to the situation wherein the container is at least partly filled. The first condition may be determined by a single measurement if the vessel is empty, or may be determined incrementally as the vessel empties.

Preferably one of the two conditions is taken as a "base" or "reference" condition for the composition. For example, the empty condition of a container (such as a silo) may be expressed to be the "base" or "reference" condition and the filled or partly-filled condition may then be expressed as being relative to that "base" or "reference".

Comparison of the two conditions may be achieved by means of systems which are well known to those skilled in the art to which the present invention relates.

The present invention will be illustrated, merely by way of example, in the following description and with reference to the accompanying drawings.

DETAILED DESCRIPTION

Figure 1:
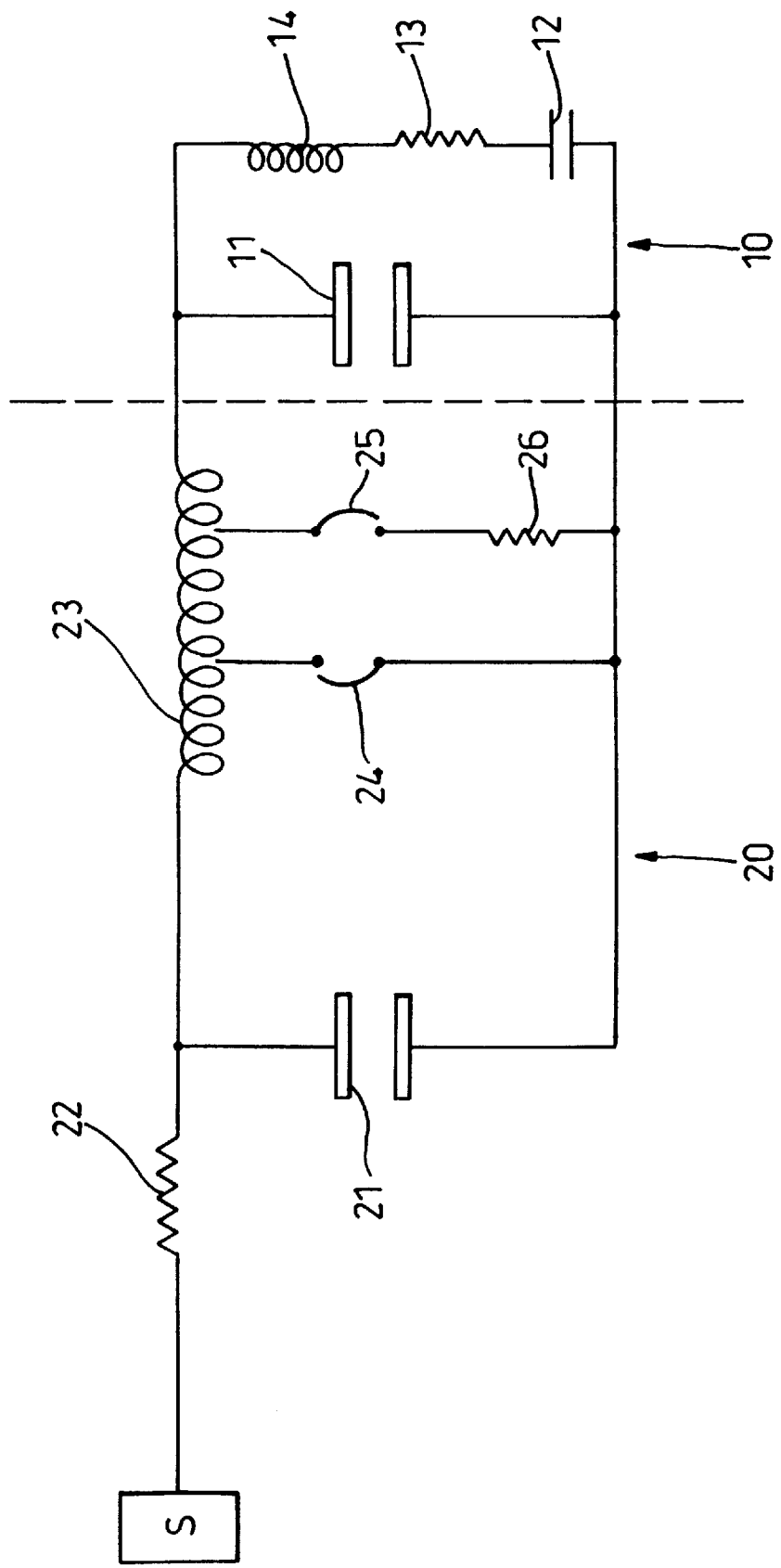
FIG. 1 is a schematic circuit diagram of a transducer assembly according to the first aspect of the present invention.

Referring to FIG. 1, the assembly comprises a transducer (shown generally at 10) and a drive-circuit (shown generally at 20) therefor.

The transducer 10 is represented by a first capacitor 11 inherent in the device, operatively associated with a second capacitor 12, a resistor 13 and an inductor 14 which represent the mechanical resonance properties of the said transducer.

The drive-circuit 20 comprises a charge storage device (which is represented by capacitor 21) and which is supplied from a D.C. supply S necessarily incorporating some source resistance, resistor 22. An inductor 23 is installed in the drive-circuit 20 in such a way that it may both receive an input current from capacitor 21 and transmit that current to capacitor 11. This is achieved by a switch 24 positioned at some point along the inductor winding. A further combination of switch 25 and resistor 26 may also be positioned at some point along the winding to provide a degree of pulse shaping by increasing the rate of decay of the pulse after a predetermined time.

Figure 2:
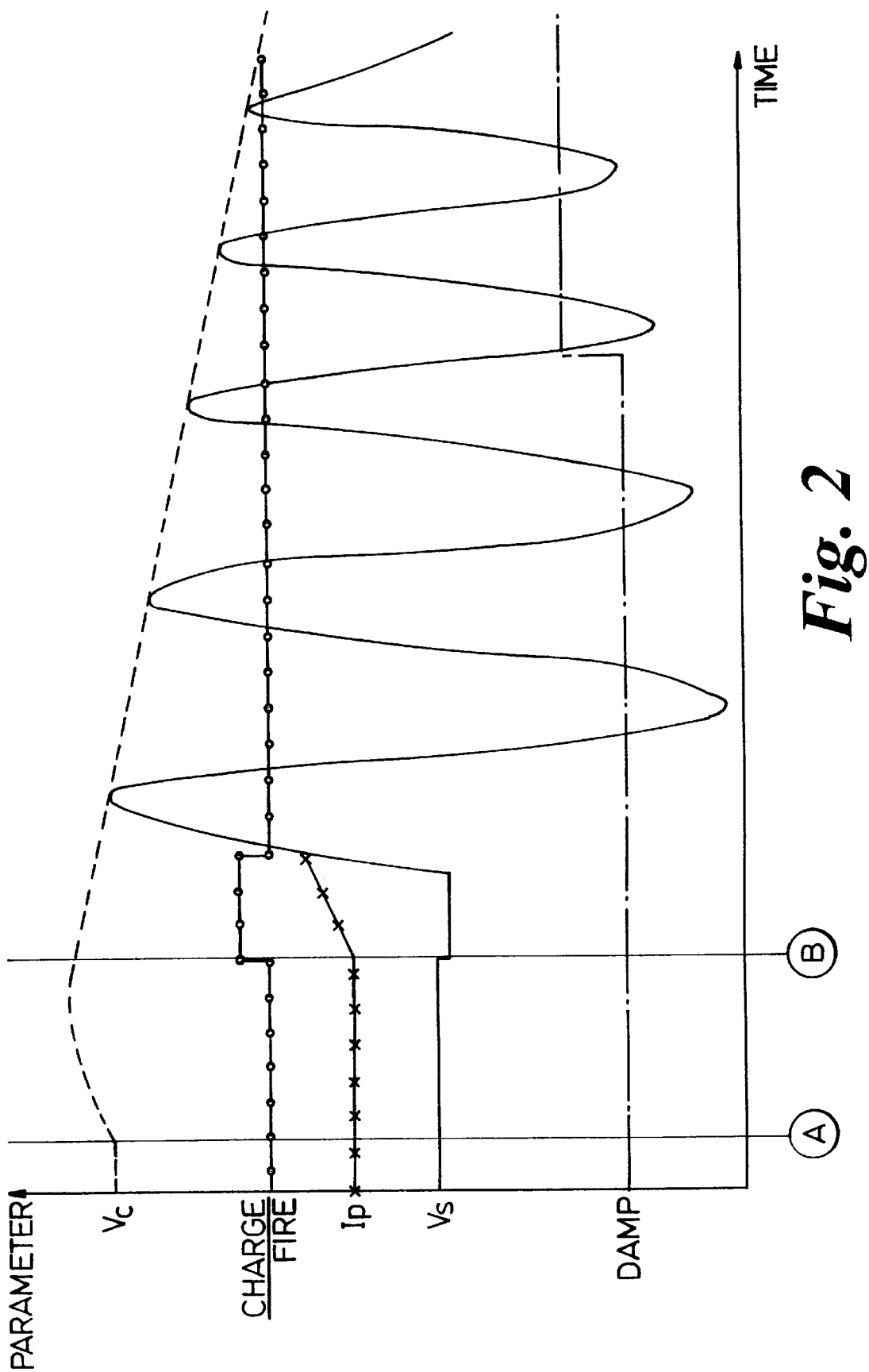
FIG. 2 is a schematic representation of the variation of parameters of the assembly of FIG. 1 with time.

In FIG. 2, the schematic plots are made against time and have the following significance:

Vc: represents the voltage across the capacitor 21;

CHARGE/FIRE: represents the operation of switch 24;

Ip: represents the current in the primary winding of inductor 23;

Vs: represents the secondary voltage impressed upon capacitor 11.

DAMP: represents the operation of switch 25.

In operation of the transducer assembly, power is supplied to capacitor 21 from supply S (this corresponds to point A in FIG. 2) and the voltage across capacitor 21 rises to its predetermined maximum (about 24 v) as shown by the plot Vc in FIG. 2. On reaching the maximum voltage (i.e. after a time interval corresponding to point B in FIG. 2) the switch 24 is closed and the primary winding of the inductor 23 receives an input voltage from capacitor 11 which causes the current in the said primary winding to increase. Upon the subsequent opening of switch 24, the current built up in the inductor can now only flow into the transducer, and will generate a voltage across the transducer commensurate with the energy held originally in the inductor.

Some of this current will flow through the series-resonant arms of the transducer, 12, 13, 14 which will therefore emit sound waves.

With suitably chosen values of inductor 23 and capacitor 11 interchange of energy between the inductor 23 and the capacitor 11 of the transducer can be made to occur close to the resonant frequency of the transducer, thus maximising the excitation of the transducer.

Application of the switch 25 damps the voltage Vs which increases the losses in the resonant system (inductor 23 and capacitor 11), and thus increases the rate at which the pulse decays, which can be a desirable factor (see plot Vs in FIG. 2).

For example, a transducer assembly of the type hereinabove described can be used to determine the level of contents of fuel in a tank, of water in a well, of feed in a silo or of the rate of flow of water over a weir.

What is claimed is:

1. A transducer assembly adapted for pulse-emission of a signal, said assembly comprising:

(a) a transducer; and (b) a drive-circuit for said transducer, wherein said drive-circuit includes a charge storage device, a wound coil assembly and at least one switching-element which are all operatively associated with one another and with said transducer, and wherein said wound coil assembly is provided with at least one tap to produce at least one tapped portion in said wound coil assembly, said at least one tapped portion being adapted to resonate with said transducer at a resonance frequency of the transducer.

2. The assembly of claim 1, wherein said transducer includes at least one surface consisting essentially of a material capable of exhibiting a piezo-electric effect.

3. The assembly of claim 2, wherein said material capable of exhibiting a piezo-electric effect comprises a ceramic material.

4. The assembly of claim 1, wherein said transducer comprises an air-transducer.

5. The assembly of claim 1, wherein said charge storage device comprises a capacitor.

6. The assembly of claim 5, wherein said capacitor has a capacitance of about 1000 $\mu$F.

7. The assembly of claim 5, wherein said capacitor is operatively associated with at least one battery.

8. The assembly of claim 1, wherein said charge storage device comprises at least one battery.

9. The assembly of claim 1, wherein said wound coil device comprises at least one winding on a core of a magnetic material, and said wound coil device functions as an inductor.

10. The assembly of claim 9, wherein said inductor has an inductance of about 1 mH.

11. The assembly of claim 1, wherein said at least one switching element comprises a semi-conductor device.

12. A method of comparing a first condition and a second condition of an enclosed container, wherein said method comprises:

(i) utilizing at least one transducer assembly of claim 1 to measure at least one parameter of each of said first condition and said second condition, and (ii) comparing results of said measured parameters.

13. The method of claim 12, wherein said first condition of said container corresponds to said container being empty and said second condition of said container corresponds to said container being at least partly filled.

\* \* \* \* \*